C. C. KERR.
Velocipede.

No. 198,627.  Patented Dec. 25, 1877.

Witnesses:  Inventor.

UNITED STATES PATENT OFFICE.

CHRISTOPHER C. KERR, OF CARTHAGE, ASSIGNOR TO JAMES N. HAWORTH, OF ALBA, MISSOURI.

IMPROVEMENT IN VELOCIPEDES.

Specification forming part of Letters Patent No. 198,627, dated December 25, 1877; application filed June 23, 1877.

*To all whom it may concern:*

Be it known that I, CHRISTOPHER C. KERR, of Carthage, in the county of Jasper and State of Missouri, have invented certain new and useful Improvements in Velocipedes; and I do hereby declare that the following is a full, clear, and exact description thereof, reference being had to the accompanying drawings, and to the letters of reference marked thereon, which form part of this specification.

The nature of my invention consists in the construction and arrangement of a velocipede, as will be hereinafter more fully set forth.

In order to enable others skilled in the art to which my invention appertains to make and use the same, I will now proceed to describe its construction and operation, referring to the annexed drawing, in which—

Figure 1:
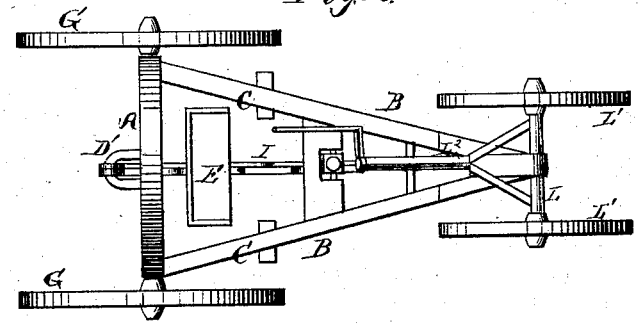
Figure 2:
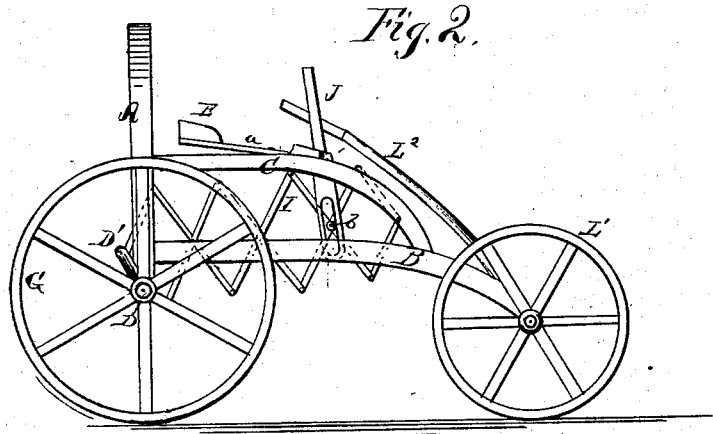
Figure 3:

Figure 1 is a plan view, Fig. 2 is a side elevation, and Fig. 3 is a detail view of a part, of my improved velocipede.

The frame of my velocipede is composed of a single upright arched bar, A, in the rear, from near the lower ends of which extend two curved side bars, B B, having their front ends united together. Two other side bars, C C, project from the arms of the arched bar A, and have their front ends curved downward and fastened to the side bars B on the top, near the front ends.

E is the seat, supported upon the side bars C by spring-arms $a\ a$.

The ends of the arched bar A are provided with suitable boxes, in which the axle D is placed, said axle having the wheels G G secured on its ends.

In the center of the axle D is formed a crank, D', to which is connected one end of a series of levers, I, arranged in the well-known form of "lazy-tongs," the other end of said lazy-tongs being attached to a cross-bar connecting the side bars C C near the front end. One of the rivets forming the joints in the lazy-tongs, near the front end, is extended on both sides; or a pin may be passed at any point through one of the levers, and on the ends thereof are placed friction-rollers $b\ b$, which work in the slotted arms of a forked lever, J, and this lever is pivoted in a cross-bar connecting the side bars C C at such point that a person seated on the seat E can easily work the same backward and forward.

The front ends of the side bars B B are connected by any suitable swivel-joint with the center of the front axle L, which has the wheels $L^1\ L^1$ secured on its ends. To this axle is also connected a forked lever, $L^2$, which extends far enough back for the rider to manipulate the same for turning the front axle in either direction, and thus steer the velocipede.

By working the lever J by hand back and forth the lazy-tongs I are extended and contracted, so as to obtain a long and powerful leverage on the crank D' of the axle for rotating the same.

Having thus fully described my invention, what I claim as new, and desire to secure by Letters Patent, is—

1. The combination of the crank-axle D, lazy-tongs I, and lever J, all arranged in a velocipede, as and for the purposes herein set forth.

2. A velocipede, consisting of the frame A B C, with seat E, rear crank-axle D, with wheels G, lazy-tongs I, lever J, front axle L, wheels $L^1$, and lever $L^2$, all constructed substantially as and for the purposes herein set forth.

In testimony that I claim the foregoing as my own I affix my signature in presence of two witnesses.

CHRISTOPHER C. KERR.

Witnesses:
 THOS N. HARPER,
 D. W. ATKINSON.